(12) United States Patent
Takahashi et al.

(10) Patent No.: US 10,772,000 B2
(45) Date of Patent: Sep. 8, 2020

(54) USER EQUIPMENT, BASE STATION, AND MEASUREMENT METHOD

(71) Applicant: NTT DOCOMO, INC., Tokyo (JP)

(72) Inventors: Hideaki Takahashi, Tokyo (JP); Kazuaki Takeda, Tokyo (JP); Yuta Sagae, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/300,022

(22) PCT Filed: Mar. 31, 2017

(86) PCT No.: PCT/JP2017/013534
§ 371 (c)(1),
(2) Date: Nov. 8, 2018

(87) PCT Pub. No.: WO2017/195494
PCT Pub. Date: Nov. 16, 2017

(65) Prior Publication Data
US 2019/0150020 A1    May 16, 2019

(30) Foreign Application Priority Data

May 12, 2016  (JP) ................................. 2016-096524
Sep. 29, 2016  (JP) ................................. 2016-192351

(51) Int. Cl.
*H04B 17/20* (2015.01)
*H04W 24/10* (2009.01)
(Continued)

(52) U.S. Cl.
CPC .......... *H04W 24/10* (2013.01); *H04B 17/309* (2015.01); *H04W 16/28* (2013.01);
(Continued)

(58) Field of Classification Search
CPC ... H04W 17/309; H04W 24/08; H04W 24/10; H04W 72/04; H04B 17/20; H04B 17/24;
(Continued)

(56) References Cited

U.S. PATENT DOCUMENTS 10,021,584 B2    7/2018  Jung et al.
2014/0098690 A1*  4/2014  Siomina .................... G01S 5/12
370/252
(Continued)

FOREIGN PATENT DOCUMENTS

EP    2800412 A1    11/2014
EP    3217710 A1    9/2017
(Continued)

OTHER PUBLICATIONS

International Search Report issued in corresponding International Patent Application No. PCT/JP2017/013534, dated Jun. 6, 2017 (5 pages).
(Continued)

*Primary Examiner* — Blane J Jackson
(74) *Attorney, Agent, or Firm* — Osha Liang LLP

(57) ABSTRACT

There is provided user equipment of a radio communication system including a base station and the user equipment, the user equipment including a receiver that receives, from the base station, measurement band information indicating a frequency range in which received quality is measured in a system bandwidth; and a measurer that measures the received quality in the frequency range indicated by the measurement band information.

7 Claims, 10 Drawing Sheets

(51) Int. Cl.
| | |
|---|---|
| *H04W 16/28* | (2009.01) |
| *H04W 48/08* | (2009.01) |
| *H04B 17/309* | (2015.01) |
| *H04W 24/08* | (2009.01) |
| *H04W 36/00* | (2009.01) |
| *H04W 48/10* | (2009.01) |
| *H04W 48/20* | (2009.01) |
| *H04W 88/08* | (2009.01) |

(52) U.S. Cl.
CPC .......... *H04W 24/08* (2013.01); *H04W 48/08* (2013.01); *H04W 36/0094* (2013.01); *H04W 48/10* (2013.01); *H04W 48/20* (2013.01); *H04W 88/08* (2013.01)

(58) Field of Classification Search
CPC ... H04B 17/309; H04B 17/318; H04B 17/382
See application file for complete search history.

(56) References Cited

U.S. PATENT DOCUMENTS

| | | | |
|---|---|---|---|
| 2014/0128115 A1* | 5/2014 | Siomina | H04L 1/0015 455/501 |
| 2015/0113309 A1* | 4/2015 | Grieco | G06F 11/3062 713/340 |
| 2015/0170496 A1* | 6/2015 | King | G08B 21/24 340/686.6 |
| 2015/0358846 A1* | 12/2015 | Wu | H04W 36/0094 370/252 |
| 2016/0013984 A1 | 1/2016 | Sun et al. | |
| 2016/0057708 A1* | 2/2016 | Siomina | H04W 52/243 455/452.2 |
| 2017/0055202 A1 | 2/2017 | Uchiyama et al. | |
| 2017/0195028 A1 | 7/2017 | Shimezawa et al. | |
| 2017/0311193 A1* | 10/2017 | Jiang | H04W 24/10 |

FOREIGN PATENT DOCUMENTS

| | | |
|---|---|---|
| EP | 3322215 A1 | 5/2018 |
| WO | 2013116272 A1 | 8/2013 |
| WO | 2014/077658 A1 | 5/2014 |
| WO | 2015/113309 A1 | 8/2015 |
| WO | 2015/170496 A1 | 11/2015 |
| WO | 2015/182742 A1 | 12/2015 |
| WO | 2016/045418 A1 | 3/2016 |
| WO | 2016070578 A1 | 5/2016 |
| WO | 2017010379 A1 | 1/2017 |

OTHER PUBLICATIONS

Written Opinion issued in corresponding International Patent Application No. PCT/JP2017/013534, dated Jun. 6, 2017 (5 pages).
3GPP TS 36.304, V12.4.0, "3rd Generation Partnership Project; Technical Specification Group Radio Access Network; Evolved Universal Terrestrial Radio Access (E-UTRA); User Equipment (UE) procedures in idle mode (Release 12)." Mar. 2015 (38 pages).
3GPP TS 36.331, V12.5.0, "3rd Generation Partnership Project; Technical Specification Group Radio Access Network; Evolved Universal Terrestrial Radio Access (E-UTRA); Radio Resource Control (RRC); Protocol specification (Release 12)," Mar. 2015 (444 pages).
3GPP TS 36.300, V13.3.0, "3rd Generation Partnership Project; Technical Specification Group Radio Access Network; Evolved Universal Terrestrial Radio Access (E-UTRA) and Evolved Universal Terrestrial Radio Access Netowrk (E-UTRAN); Overall description; Stage 2 (Release 13)," Mar. 2016 (295 pages).
3GPP TS 36.133, V13.3.0, "3rd Generation Partnership Project; Technical Specification Group Radio Access Network; Evolved Universal Terrestrial Radio Access (E-UTRA); Requirements for support of radio resource management (Release 13)," Mar. 2016 (1,581 pages).
Extended European Search Report issued in the counterpart European Application No. 17795855.0, dated Jan. 17, 2020 (13 pages).
Office Action issued in Japanese Application No. 2018-516887; dated Jun. 23, 2020 (11 pages).
Office Action issued in the counterpart Israeli Application No. 262736, dated Apr. 30, 2020 (6 pages).

* cited by examiner

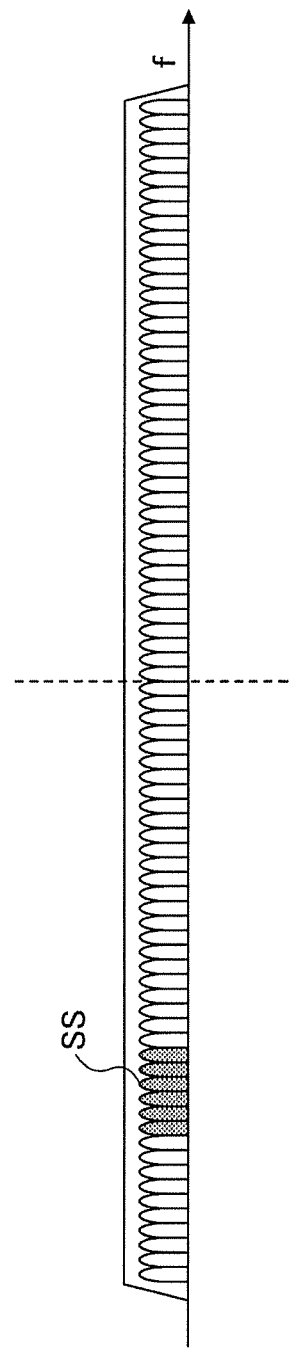

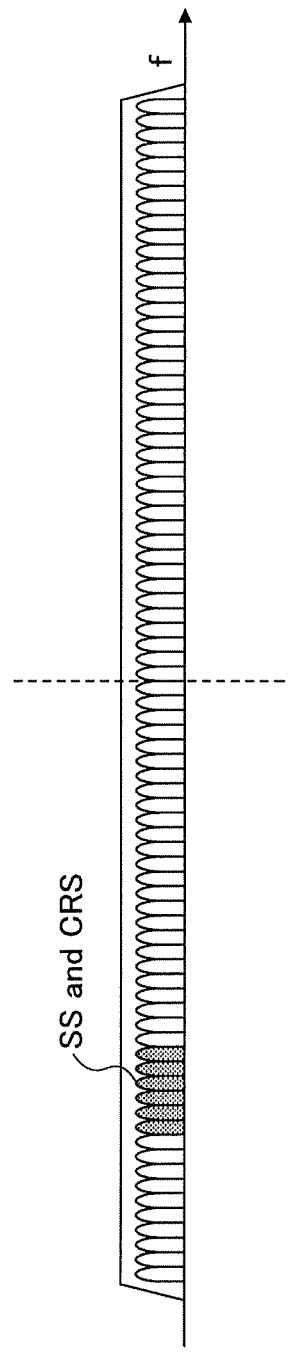

USER EQUIPMENT, BASE STATION, AND MEASUREMENT METHOD

TECHNICAL FIELD

The present invention relates to a user equipment, a base station, and a measurement method.

BACKGROUND ART

In an LTE-based mobile communication system, a user equipment UE in an RRC idle state measures received qualities (Reference Signal Received Power (RSRP)/Reference Signal Received Quality (RSRQ)) of signals which are transmitted from a base station eNB of a serving cell and a base station eNB of an adjacent cell, and performs cell selection or cell reselection on the basis of the measurement result (for example, see Non-Patent Document 1).

A user equipment UE in an RRC connected state measures received quality of signals which are transmitted from a base station eNB of a serving cell and a base station eNB of an adjacent cell and broadcasts the measurement result as a measurement report to the base stations eNB, and the base stations eNB control, for example, a handover on the basis of the measurement report (for example, see Non-Patent Document 2).

PRIOR ART DOCUMENT

Non-Patent Document

Non-Patent Document 1: 3GPP TS 36.304 V12.4.0 (2015-03)
Non-Patent Document 2: 3GPP T536.331 V12.5.0 (2015-03)

SUMMARY OF THE INVENTION

Problem to be Solved by the Invention

In the current 3GPP, a user equipment UE is prescribed to measure received quality (RSRP/RSRQ) using resources of a bandwidth of 6 resource blocks (RB) or 50 RB at the center of a system band. In general, a user equipment UE often measures received quality using resources of a bandwidth corresponding 6 RB in consideration of power consumption or the like.

Here, when received quality is measured using the bandwidth corresponding to 6 RB, there is a case in which the received quality cannot be correctly measured. For example, as illustrated in FIG. 1, a scenario in which a serving cell 1 having a system bandwidth of 10 MHz (in which an actual transmission bandwidth is 9 MHz), an adjacent cell 2 having a system bandwidth of 5 MHz (in which an actual transmission bandwidth is 4.5 MHz) centered on a frequency separated by −2.5 MHz from the center frequency of the serving cell 1, and an adjacent cell 3 having a system bandwidth of 5 MHz (in which an actual transmission bandwidth is 4.5 MHz) centered on a frequency separated by +2.5 MHz from the center frequency of the serving cell 1 are present is assumed. In this scenario, a gap of 0.5 MHz (5−(4.5+4.5)/2=0.5) is generated between the transmission bands of the adjacent cell 2 and the adjacent cell 3. Accordingly, when the received quality is measured using the bandwidth corresponding to 6 RB at the center of the system bandwidth in the serving cell 1, degrees of interference of the adjacent cell 2 and the adjacent cell 3 are not satisfactorily considered.

In order to solve this problem, in Release 11 of the LTE, a structure which is called wideband RSRQ measurement is defined. The wideband RSRQ measurement is a system in which the received quality is measured using the actual transmission bandwidth of the system bandwidth. However, since the received quality is measured using a large bandwidth, the power consumption of the user equipment using the wideband RSRQ measurement increases.

In the 3GPP, fifth-generation (5G) radio technology has been studied to realize a further increase in capacity of the system capacity. Since there is a high possibility that radio technology other than the LTE will be employed in the 5G, a radio network supporting the 5G is referred to as a new radio access network (NewRAT) to distinguish it from the radio network supporting the LTE.

In the 5G, it is assumed that a system bandwidth larger than the system bandwidth (20 MHz in maximum) of the LTE is supported. Accordingly, there is a problem in that power consumption of a user equipment further increases when the wideband RSRQ measurement is used. Accordingly, in the 5G, a structure that can solve the problem described above with reference to FIG. 1 and suppress power consumption of a user equipment is necessary in measuring received quality.

A technique disclosed herein is made in consideration of the above-mentioned circumstances and an object thereof is to provide a technique enabling a received quality measuring method to be flexibly set in a user equipment so as to accurately measure interference of an adjacent cell for each cell.

Means for Solving the Problem

According to an aspect of the present invention, there is provided user equipment of a radio communication system including a base station and the user equipment, the user equipment including a receiver that receives, from the base station, measurement band information indicating a frequency range in which received quality is measured in a system bandwidth; and a measurer that measures the received quality in the frequency range indicated by the measurement band information.

Advantage of the Invention

According to the disclosed technique, a received quality measuring method can be flexibly configured in user equipment, and, thus, interference caused by an adjacent cell can be accurately measured for each cell.

BRIEF DESCRIPTION OF DRAWINGS

FIG. 6 is a diagram illustrating an example of arrangement of a synchronization signal;

FIG. 7A is a diagram illustrating an example of arrangement (time multiplexing) of a synchronization signal and a reference signal;

EMBODIMENTS OF THE INVENTION

Hereinafter, embodiments of the invention will be described with reference to the accompanying drawings. The embodiments described below are only examples and embodiments of the invention are not limited to the following embodiments. For example, a radio communication system according to the embodiments is assumed to be an LTE-based (including 5G) system, but the invention is not limited to the LTE (including 5G) and can be applied to another scheme. In the specification and the appended claims, "LTE" is used in a wide meaning including fifth-generation communication schemes corresponding to Releases 10, 11, 12, 13, and 14 of 3GPP and releases subsequent thereto as well as communication schemes corresponding to Releases 8 and 9 of 3GPP.

<System Configuration>

Figure 2:
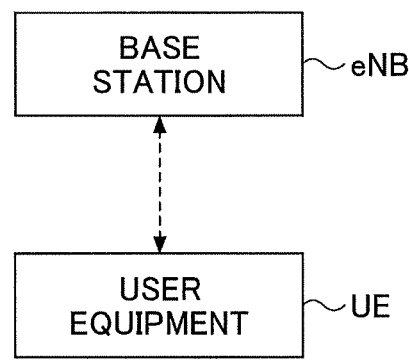
FIG. 2 is a diagram illustrating an example of a configuration of a radio communication system according to an embodiment.

FIG. 2 is a diagram illustrating an example of a configuration of a radio communication system according to an embodiment. As illustrated in FIG. 2, the radio communication system according to this embodiment includes a base station eNB and a user equipment UE. One base station eNB and one user equipment UE are illustrated in FIG. 2, but this is only an example and plural base stations and plural user equipments UE may be present.

The base station eNB and the user equipment UE may support both the LTE and the NewRAT (NR) of the 5G, may support only the NewRAT (NR) of the 5G, or may support only the LTE.

<Processing Sequence>

Figure 3:
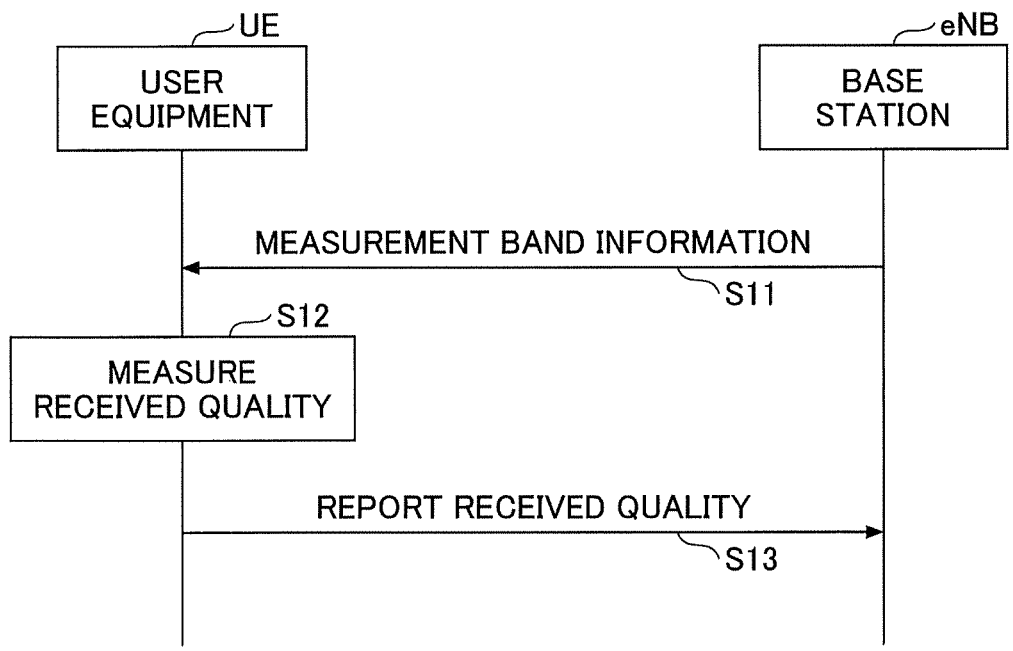
FIG. 3 is a sequence diagram illustrating an example of a processing sequence which is performed by the radio communication system according to the embodiment.

FIG. 3 is a sequence diagram illustrating an example of processing sequence which is performed by the radio communication system according to the embodiment.

Figure 4:
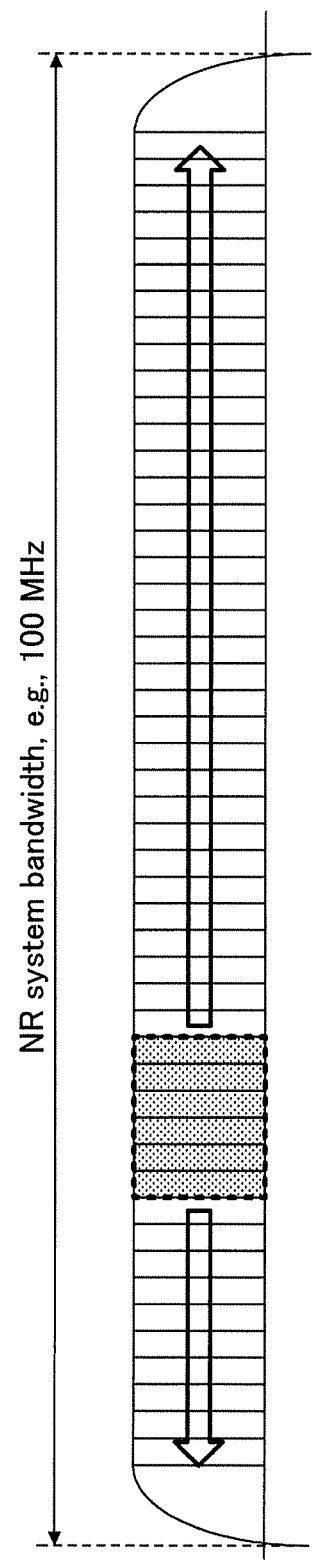
FIG. 4 is a diagram illustrating an example of a configuration of measurement band information.

In Step S11, a base station eNB transmits measurement band information (hereinafter referred to as "measurement band information") indicating a frequency range in which received quality is measured to a user equipment UE. When the user equipment UE is in the RRC connected state, the base station eNB may transmit the measurement band information to the user equipment UE using an RRC message. When the user equipment UE is in the RRC idle state, the base station eNB may transmit (broadcast) the measurement band information using broadcast information. A setting example of the measurement band information is illustrated in FIG. 4. As illustrated in FIG. 4, an arbitrary frequency range can be set in the measurement band information. The frequency range may be expressed using indices of RBs. For example, when indices (for example, RB#0 to RB#100 in the ascending order) are allocated to the RBs over the entire system band in advance, the frequency range may be expressed, for example, by RB#10 to RB#20.

Figure 1:
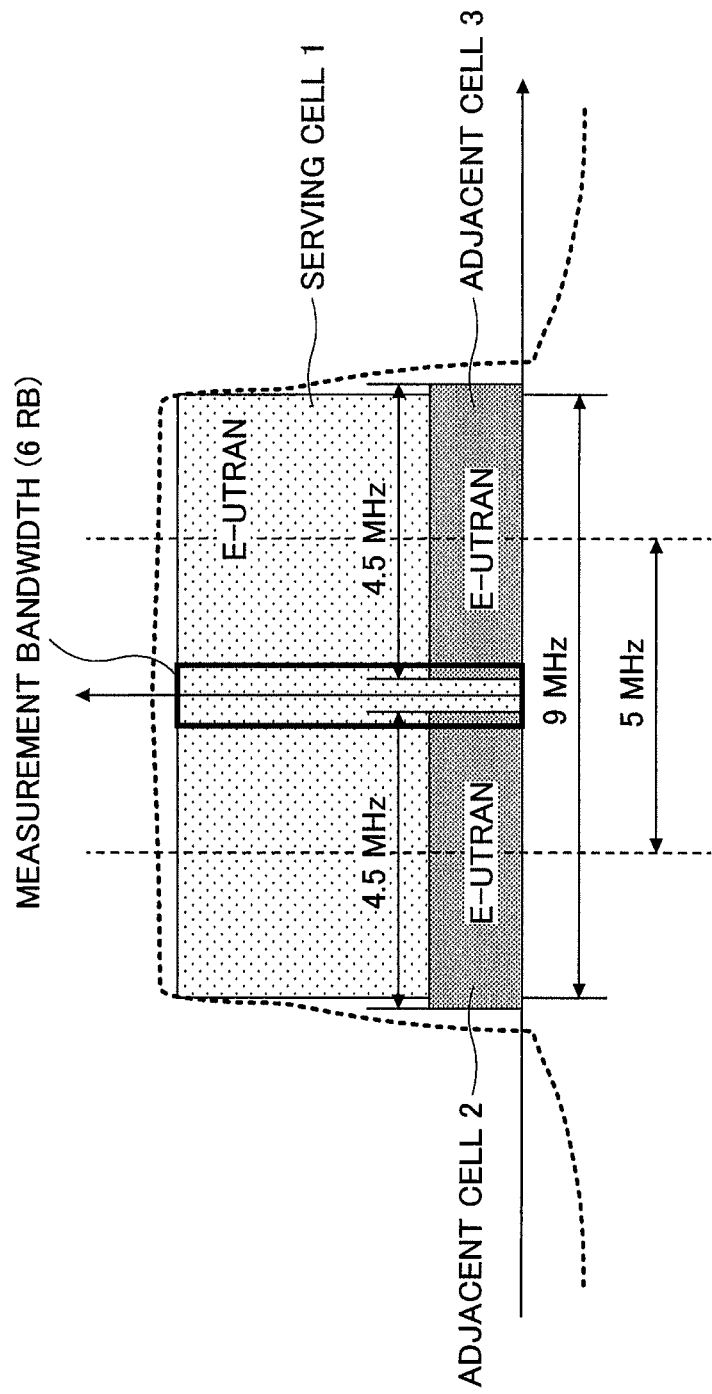
FIG. 1 is a diagram illustrating a problem.

The frequency range may be set in any way, but it is preferable that the frequency range be set to frequencies (frequencies at which the problem described with reference to FIG. 1 does not occur) at which an interference of an adjacent cell can be appropriately measured. In order to suppress power consumption of the user equipment UE, it is preferable that a width of the frequency range (a measurement band) be set to a certain narrow bandwidth.

In Step S12, the user equipment UE measures received quality of a cell in the frequency range indicated by the measurement band information received from the base station eNB. The received quality may be RSRQ, RSRP, RSSI, or SINR and may include a part or all thereof.

The measurement of the received quality may be performed using any method, but the user equipment UE may measure the received quality, for example, using any one of a reference signal or a synchronization signal which is mapped on the frequency range indicated by the measurement band information. The reference signal may be a reference signal specific to the user equipment UE or may be a reference signal specific to the cell. Similarly, the synchronization signal may be a synchronization signal (SS) specific to the user equipment UE or may be a synchronization signal specific to the cell.

The user equipment UE may switch the received quality measuring method in the RRC connected state and the RRC idle state. For example, the user equipment UE may measure the received quality using the reference signal specific to the user equipment UE or the synchronization signal specific to the user equipment UE when it is in the RRC connected state, and may measure the received quality using the reference signal specific to the cell or the synchronization signal specific to the cell when it is in the RRC idle state.

In Step S13, the user equipment UE reports the measurement result of the received quality to the base station eNB.

The processing sequence which is performed by the radio communication system according to the embodiment has been described hitherto. Through the above-mentioned processing sequence, the measurement band can be set in consideration of the interference of an adjacent cell. Even when the system bandwidth is wide, it is possible to suppress the measurement band and to suppress the power consumption of the user equipment UE based on the measurement of the received quality.

Figure 5:
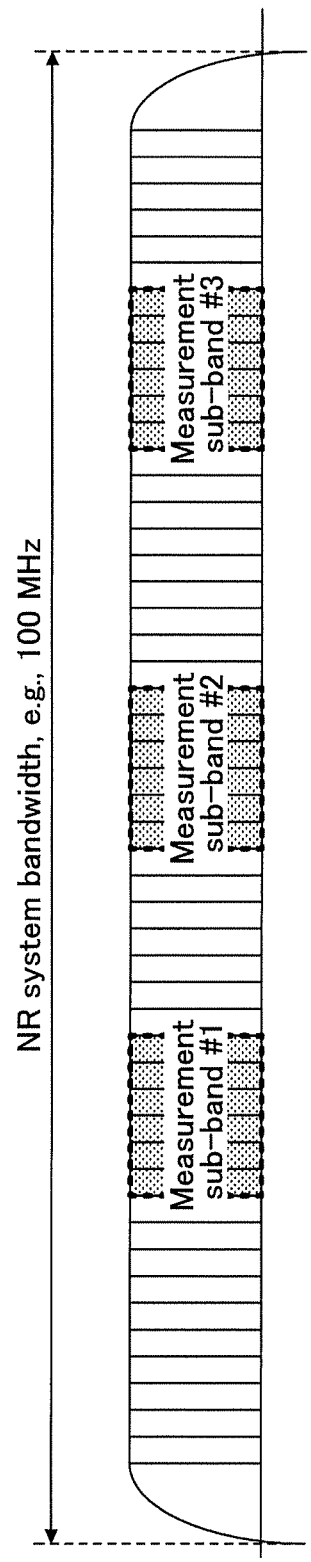
FIG. 5 is a diagram illustrating an example of a configuration of the measurement band information.

As illustrated in FIG. 5, plural frequency ranges may be set in the measurement band information which is transmitted from the base station eNB to the user equipment UE in the processing sequence of Step S11. In this case, in the processing sequence of Step S12, the user equipment UE measures the received quality for each of the plural frequency ranges. In the processing sequence of Step S13, the user equipment UE may report the measured received qualities to the base station eNB or may report an average value of the measured received qualities to the base station eNB. In the example illustrated in FIG. 5, three frequency ranges of sub-band #1, sub-band #2, and sub-band #3, and the user equipment UE measures the received qualities of sub-band #1, sub-band #2, and sub-band #3 and reports the measured received qualities to the base station eNB.

Accordingly, even when the system bandwidth is wide and the interference of an adjacent cell varies depending on the frequency, it is possible to suppress the power consumption of the user equipment UE and to appropriately measure the received quality.

At a timing such as an attachment timing, the user equipment UE may transmit capability information (for example, UE Capability Information) indicating whether the user equipment UE has capability of receiving the measurement band information in which plural frequency ranges are set and measuring the received quality to the base station eNB. Accordingly, only when the user equipment UE has the capability, the base station eNB can transmit the measurement band information in which plural frequency ranges are set to the user equipment UE.

(Synchronization Signal and Reference Signal)

In Step S12, in order to cause the user equipment UE in the RRC idle state to measure the received quality using the synchronization signal (the synchronization signal specific to the cell) and/or the reference signal (the reference signal specific to the cell), the base station eNB needs to the synchronization signal and/or the reference signal in advance in the measurement band indicated by the measurement band information. However, in the conventional rule of the LTE, the synchronization signal is fixedly defined to be transmitted using six RB at the center of the system band. Accordingly, in order to embody the invention, a structure for causing the base station eNB to transmit the synchronization signal and the reference signal, which are used to measure the quality, in an arbitrary band in the system band is required.

[Synchronization Signal]

In this embodiment, as illustrated in FIG. 6, the base station eNB transmits the synchronization signal in an arbitrary band in the system band and transmits broadcast information (Master Information Block (MIB)) including the center frequency of a carrier and/or the system bandwidth in the same band as the synchronization signal or a band separated by a predetermined offset from the synchronization signal. The predetermined offset may be defined in advance in a standard specification. A corresponding relationship between a signal sequence of the synchronization signal and the offset value may be defined in advance in a standard specification and the user equipment UE may recognize the offset value from the signal sequence of the received synchronization signal.

More specifically, the base station eNB may include information indicating the system bandwidth in an MIB which is transmitted using a physical broadcast channel (PBCH) and transmit the MIB, and may include information indicating the center frequency of the carrier in a system information block (SIB) (for example SIB1) which is transmitted using a physical downlink shared channel (PDSCH) and transmit the SIB. Alternatively, the base station eNB may include the information indicating the center frequency of the carrier in an MIB and transmit the MIB, and may include the information indicating the system bandwidth in an SIB (for example, SIB1) and transmit the SIB. The base station eNB may include the information indicating the system bandwidth and the information indicating the center frequency of the carrier in an MIB and transmit the MIB. Information indicating positions of radio resources (a time resource and a frequency resource) in which the SIB is included in the MIB.

The base station eNB may transmit the synchronization signal using six PRB similarly to the conventional LTE, but is not limited thereto and may transmit a bandwidth other than the six PRB.

Accordingly, the user equipment UE can recognize the center frequency of the carrier and the system bandwidth by receiving broadcast information after detecting the synchronization signal by cell search. The user equipment UE can recognize at what position the synchronization signal is present in the system band.

[Reference Signal]

Figure 7B:
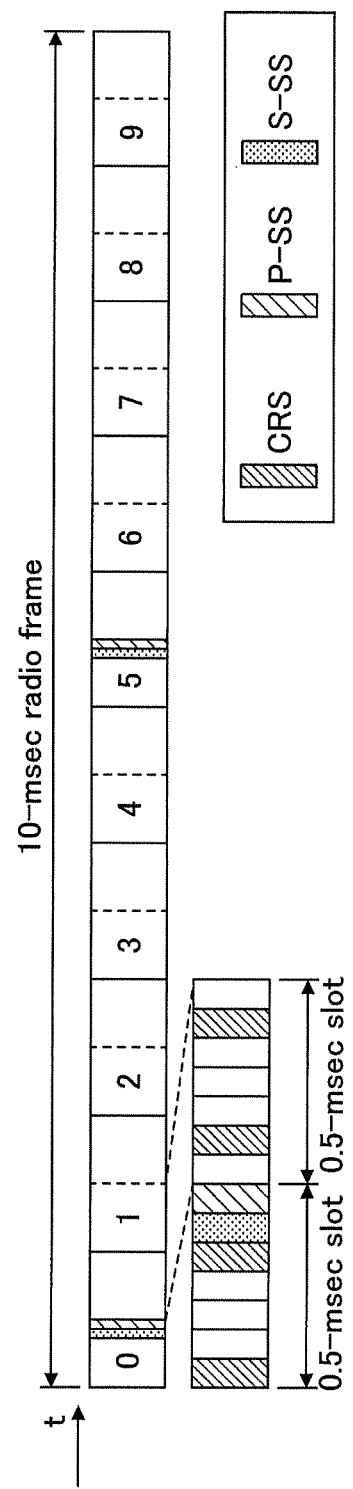
FIG. 7B is a diagram illustrating an example of arrangement (time multiplexing) of a synchronization signal and a reference signal.

The base station eNB may time-multiplex the reference signal (for example, a cell specific reference signal (CRS)), which is used to measure the received quality by the user equipment UE, in the same band as the synchronization signal. FIG. 7A illustrates a state in which a synchronization signal and a reference signal are time-multiplexed and transmitted in the same band. FIG. 7B illustrates an example of resource mapping when a synchronization signal and a reference signal are time-multiplexed. A symbol (or a resource element) in which a reference signal is transmitted in a slot in which the synchronization signal is transmitted may be defined in advance in a standard specification or may be uniquely determined on the basis of the sequence of the synchronization signal.

Figure 8:
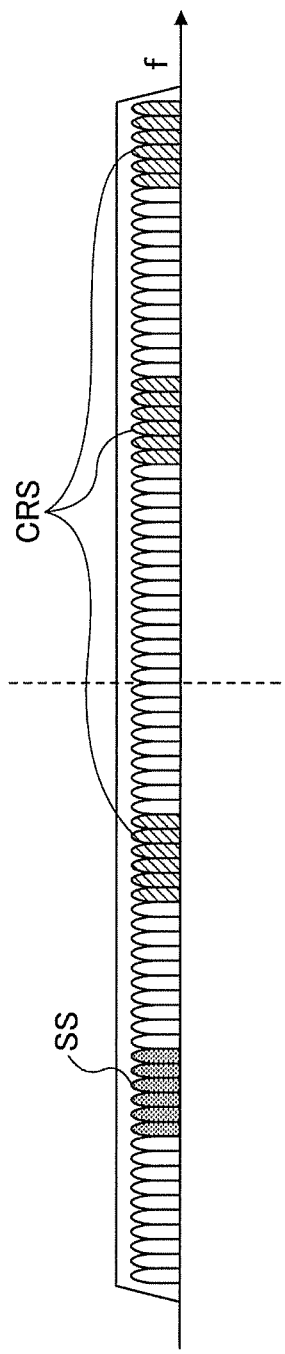
FIG. 8 is a diagram illustrating an example of arrangement (frequency multiplexing) of a synchronization signal and a reference signal.

The base station eNB may transmit the reference signal, which is used to measure a received quality by the user equipment UE, in a band different from that of the synchronization signal. FIG. 8 illustrates a state in which a synchronization signal and three reference signals are transmitted in different bands. The base station eNB may include information indicating the bands (frequency resources) in which the reference signals are transmitted in the MIB and transmit the MIB or may include the information in the SIB (for example, SIB1) and transmit the SIB. A symbol (or a resource element) in which the reference signal is transmitted may be defined in advance in a standard specification or may be uniquely determined on the basis of the sequence of the synchronization signal. Accordingly, the user equipment UE can recognize the resource in which the reference signal used to measure the received quality is transmitted by receiving broadcast information after detecting the synchronization signal by cell search.

In order to the user equipment UE performing cell reselection to recognize the resources in which the reference signals are transmitted, the base station eNB may additionally include the information indicating the bands (frequency resources) in which the reference signals are transmitted in a cell as a reselection destination in a specific SIB (for example, SIB3 and SIB5) and transmit the specific SIB. A symbol (or a resource element) in which a reference signal is transmitted in the cell as the reselection destination may be defined in advance in a standard specification or may be uniquely determined on the basis of the sequence of the synchronization signal. The user equipment UE can recognize the resource in which the reference signal to be used to measure the received quality is transmitted in the cell as a reselection destination by receiving the information using the specific SIB.

(Received Quality Measuring Method when Beam Forming is Performed)

In the 5G, it is assumed that a frequency band (for example, equal to or higher than 6 GHz) higher than the frequency which is used in the conventional LTE is used. When a high frequency band is used, the coverage is generally narrowed. Therefore, in the 3GPP, a technique called beam sweeping in which the coverage is secured in the entire areas of 360 degrees by transmitting plural narrow beams in the cell and sequentially switching the beam direction with the lapse of time has been proposed. In the example illustrated in FIG. 9, a signal is transmitted by plural narrow beams rightward from the base station. The base station transmits the signal at the entire areas of 360 degrees by sequentially switching the transmission direction of the plural narrow beams to upward, leftward, and downward with the lapse of time. Regarding the time interval in which the beam transmission direction is switched, it has been proposed that the beam transmission direction is switched such that the signal is transmitted in the entire areas of 360 degrees within one sub-frame (1 ms in the LTE).

Here, in the conventional LTE, the user equipment UE in the standby state (in the RRC idle mode) performs cell selection or cell reselection with its own state transition. The cell selection selects a cell having the highest received quality (the strongest cell) among cells satisfying a cell selection criterion (cell selection criterion S) out of cells which have been discovered by scanning a predetermined frequency. The cell selection criterion is defined by Expression 1 in 3GPP specifications (Non-Patent Document 1). Srxlev which is used in Expression 1 is defined by Equation 2 and Squal is defined by Expression 3.

$$\text{Srxlev} > 0 \text{ AND } \text{Squal} > 0 \quad \text{(Expression 1)}$$

$$\text{Srxlev} = Q_{rxlevmeas} - (Q_{rxlevmin} + Q_{rxlevminoffset}) - qaP_{compensation} - Q_{offsettemp} \quad \text{(Expression 2)}$$

$$\text{Squal} = Q_{qualmeas} - (Q_{qualmin} + Q_{qualminoffset}) - Q_{offsettemp} \quad \text{(Expression 3)}$$

Srxlev is a value of a received level (an RX level value). Squal is a value of a received quality (a quality value). $Q_{rxlevmeas}$ is a value of a received level (RSRP) in a measured cell. $Q_{qualmeas}$ is a value of a received quality (RSRQ) in a measured cell. $Q_{rxlevmin}$ is a minimum value of a requested received level. $Q_{qualmin}$ is a minimum value of a requested received level. $Q_{rxlevminoffset}$, $Q_{qualminoffset}$, and $Q_{offsettemp}$ are predetermined offset values. $P_{compensation}$ is a compensated value of uplink transmitting power of the user equipment UE.

The cell reselection is to rank a cell satisfying the above-mentioned cell selection criterion (the cell selection criterion S) among the cell discovered by scanning a predetermined frequency using a cell ranking criterion (a cell ranking criterion R) and to select a cell having a highest rank (a best cell). The cell ranking criterion is defined by Expressions 4 and 5 in the 3GPP specifications (Non-Patent Document 1). Expression 4 is applied to a serving cell and Expression 5 is applied to an adjacent cell.

$$R_s = Q_{meas,s} + Q_{Hyst} - Q_{offsettemp} \quad \text{(Expression 4)}$$

$$R_n = Q_{meas,n} - Q_{offset} - Q_{offsettemp} \quad \text{(Expression 5)}$$

$Q_{meas}$ is a value of an RSRP. More specifically, $Q_{meas,s}$ is an RSRP value of a serving cell, and $Q_{meas,n}$ is an RSRP value of an adjacent cell. $Q_{Hyst}$ and $Q_{offsettemp}$ are predetermined offset values.

Figure 9:
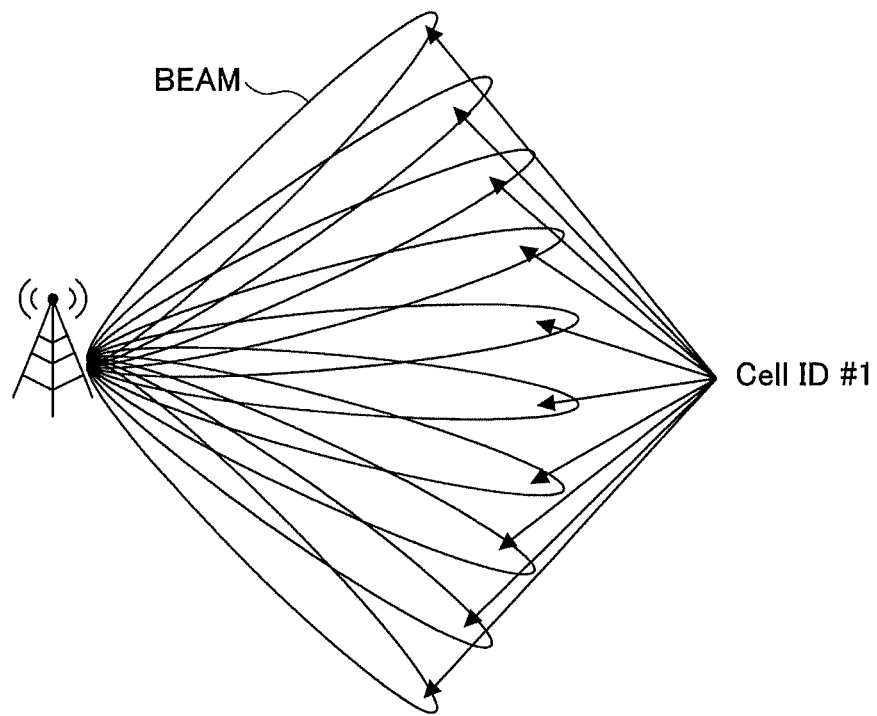
FIG. 9 is a diagram illustrating beam sweeping.

When the above-mentioned beam sweeping is performed, plural beams are transmitted from the same base station eNB. Here, as illustrated in FIG. 9, it is assumed that the base station eNB transmits a synchronization signal (a cell specific synchronization signal) and a reference signal (a cell specific reference signal) using the same cell ID (PCI: Physical Cell ID) for the plural beams. It is also assumed that the base station eNB transmits the same information for the plural beams regarding the broadcast information (the MIB and the SIB). In this case, according to the conventional LTE structure, there is a possibility that the user equipment UE receiving plural beams will erroneously recognize that plural cells having the same cell ID are present.

Therefore, when plural beams having the same cell ID are received in a cell to be measured, the user equipment UE may measure signals (synchronization signal or reference signal) which are transmitted in the plural beams and may consider a highest received quality (for example, RSRP/RSRQ/RS-SINR/other measurement indices) among the measured received qualities of the beams as the received quality of the cell to be measured.

In this case, in Expressions 2 and 3, $Q_{rxlevmeas}$ may be defined as a received level (RSRP) value of the beam having the highest received level (RSRP) in the measured cell (or among the beams having the same cell ID). $Q_{qualmeas}$ may be defined as a received quality (RSRQ) value of the beam having the highest received quality (RSRQ) in the measured cell (or among the beams having the same cell ID). In Expressions 4 and 5, $Q_{meas}$ may be defined as a received level (RSRP) value of the beam having the highest received level (RSRP) in the measured cell (or among the beams having the same cell ID).

As another method, when plural beams having the same cell ID are received, the user equipment UE may measure signals (synchronization signals or reference signals) which are transmitted in the plural beams in the cell to be measured and may consider an average value of the measured received qualities (for example, RSRP/RSRQ/RS-SINR/other measurement indices) of the beams as the received quality of the cell to be measured.

In this case, in Expressions 2 and 3, $Q_{rxlevmeas}$ may be defined as an average value of the received levels (RSRP) of the beams in the measured cell (or among the beams having the same cell ID). $Q_{qualmeas}$ may be defined as an average value of the received qualities (RSRQ) of the beams in the measured cell (or among the beams having the same cell ID). In Expressions 4 and 5, $Q_{meas}$ may be defined as an average value of the received levels (RSRP) of the beams in the measured cell (or among the beams having the same cell ID).

In the above description, the cell ID may be replaced with an evolved cell global identifier (ECGI). In Expressions 1 to 5, RS-SINR or other measurement indices may be used instead of one or both of the RSRP and the RSRQ).

In the above description, a "beam" may be referred to as a "pre-coded signal" or may be referred to as a "signal transmitted from a specific antenna port." An antenna port refers to a logical antenna port which is defined in the 3GPP. For example, the specific antenna port may be an antenna port which is defined to perform beam sweeping.

According to the above-mentioned measurement method, it is possible to appropriately measure a received quality even when beam sweeping is performed.

<Functional Configuration>

Hereinafter, an example of a functional configuration of a user equipment UE that performs an operation according to the embodiment of the invention will be described.

(User Equipment)

Figure 10:
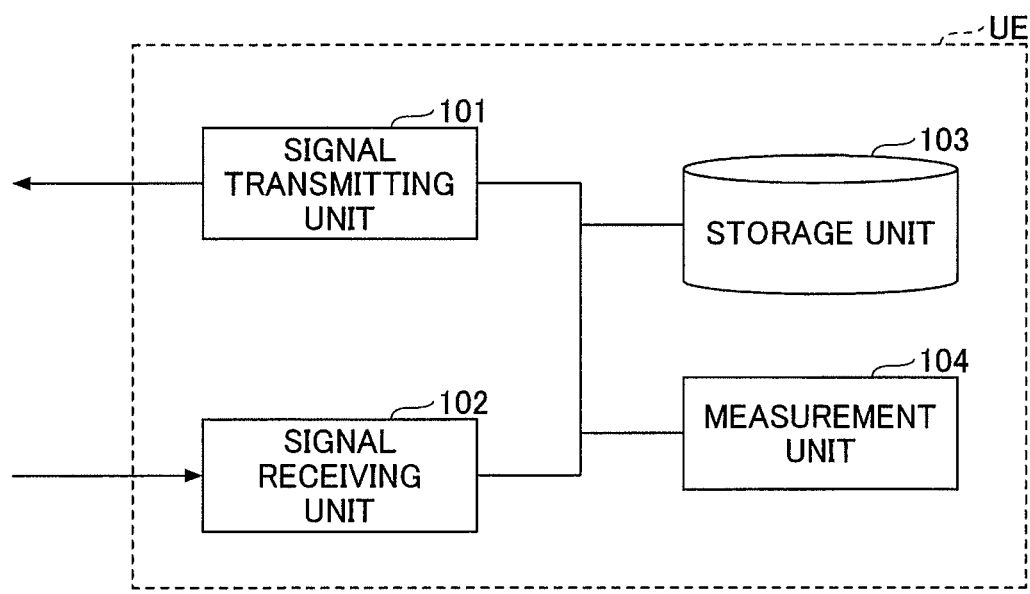
FIG. 10 is a diagram illustrating an example of a functional configuration of a user equipment according to the embodiment.

FIG. 10 is a diagram illustrating an example of a functional configuration of a user equipment according to the embodiment. As illustrated in FIG. 10, the user equipment UE includes a signal transmitting unit 101, a signal receiving unit 102, a storage unit 103, and a measurement unit 104. FIG. 10 illustrates only functional units, which are particularly associated with the invention, in the user equipment UE, and the user equipment UE has at least a function, which is not illustrated, for performing operations based on the LTE (including the 5G).

The signal transmitting unit 101 has a function of generating various signals of a physical layer from a signal of an upper layer to be transmitted from the user equipment UE and wirelessly transmitting the generated signals. The signal receiving unit 102 has a function of wirelessly receiving various signals from the base station eNB and acquiring a signal of an upper layer from the received signals of the physical layer. The signal receiving unit 102 receives measurement band information indicating a frequency range in which a received quality is measured in a system bandwidth from the base station eNB and stores the received measurement band information in the storage unit 103. The measurement band information may include plural frequency ranges. The signal receiving unit 102 may receive the measurement band information from the base station eNB using an RRC message in an RRC connected state and may receive the measurement band information from the base station eNB using broadcast information in an RRC idle state.

The storage unit 103 has a function of storing the measurement band information received from the base station eNB.

The measurement unit 104 has a function of measuring a received quality in the frequency range indicated by the measurement band information. The measurement unit 104 may measure the received quality using one of a reference signal and a synchronization signal which is mapped on the frequency range indicated by the measurement band information. When signals transmitted using plural beams (specific antenna ports) are received in the frequency range indicated by the measurement band information and the cell IDs included in the received signals are the same, the measurement unit 104 may consider a signal having the highest received quality among the signals having the same cell ID as the measured received quality.

(Base Station)

Figure 11:
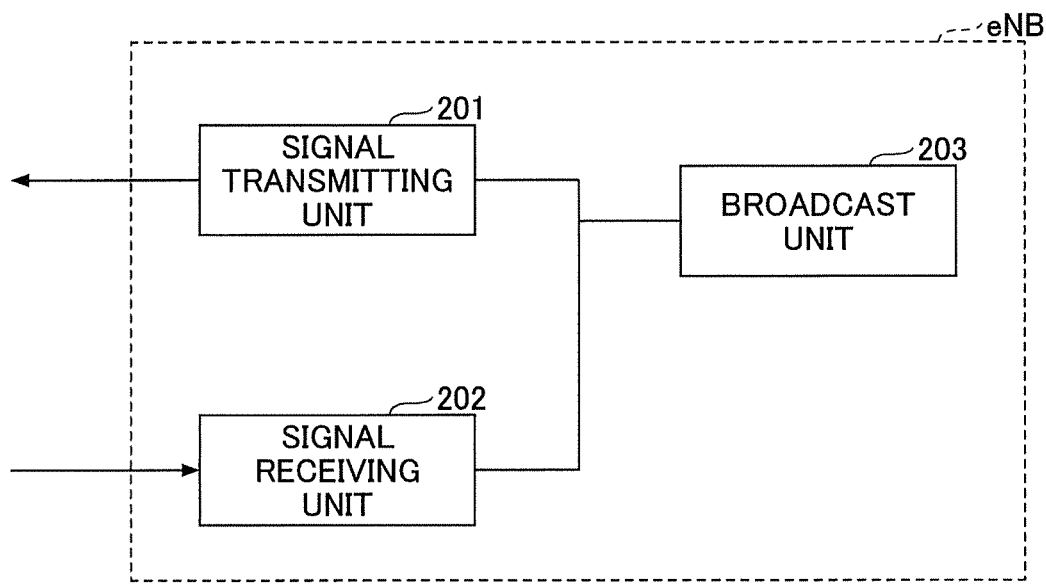
FIG. 11 is a diagram illustrating an example of a functional configuration of a base station according to the embodiment.

FIG. 11 is a diagram illustrating an example of a functional configuration of a base station according to the embodiment. As illustrated in FIG. 11, the base station eNB includes a signal transmitting unit 201, a signal receiving unit 202, and a broadcast unit 203. FIG. 11 illustrates only functional units, which are particularly associated with the invention, in the base station eNB, and the base station eNB has at least a function, which is not illustrated, for performing operations based on the LTE (including the 5G).

The signal transmitting unit 201 has a function of generating various signals of a physical layer from a signal of an upper layer to be transmitted from the base station eNB and wirelessly transmitting the generated signals. The signal receiving unit 202 has a function of receiving various radio signals from the user equipment UE and acquiring a signal of an upper layer from the received signals of the physical layer. The signal transmitting unit 201 has a function of transmitting a synchronization signal in the frequency range indicated by the measurement band information in a system bandwidth and transmitting an MIB including information indicating the system bandwidth and/or information indicating a center frequency of a carrier. The signal transmitting unit 201 may transmit the synchronization signal in the frequency range indicated by the measurement band information in the system band and may transmit the MIB including information indicating the system bandwidth and an SIB including information indicating the center frequency of the carrier. The signal transmitting unit 201 may transmit the synchronization signal in the frequency range indicated by the measurement band information in the system band and may transmit the MIB including information indicating the center frequency of the carrier and the SIB including information indicating the system bandwidth.

The broadcast unit 203 has a function of broadcasting the measurement band information indicating the frequency range in which the user equipment UE measures the received quality in the system bandwidth to the user equipment UE.

<Hardware Configuration>

The block diagrams (FIGS. 10 and 11) which are used above to describe the embodiment illustrate blocks in the units of functions. The functional blocks (constituent units) are embodied in an arbitrary combination of hardware and/or software. Means for embodying the functional blocks is not particularly limited. That is, the functional blocks may be embodied by one unit which is physically and/or logically coupled or may be embodied by two or more units which are physically and/or logically separated and which are connected directly and/or indirectly (for example, in a wired and/of wireless manner).

Figure 12:
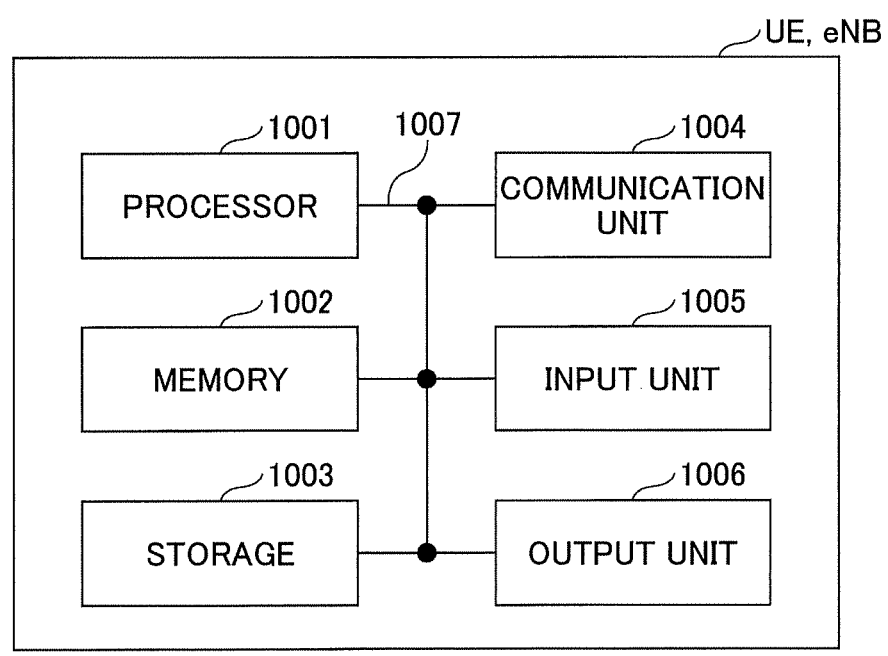
FIG. 12 is a diagram illustrating an example of a hardware configuration of a user equipment and a base station according to the embodiment.

For example, the user equipment UE and the base station eNB in the embodiment may function as computers that perform the processes of the measurement method according to the invention. FIG. 12 is a diagram illustrating an example of a hardware configuration of the user equipment and the base station according to the invention. The user equipment UE and the base station eNB may be physically configured as a computer device including a processor 1001, a memory 1002, a storage 1003, a communication unit 1004, an input unit 1005, an output unit 1006, and a bus 1007.

In the following description, a word "unit" may be referred to as a circuit, a device, a unit, or the like. The hardware configurations of the user equipment UE and the base station eNB may include one or more units illustrated in the drawing or may not include some units.

The functions of the user equipment UE and the base station eNB are realized by causing hardware such as the processor 1001 and the memory 1002 to read predetermined software (a program) and causing the processor 1001 to perform computation and to control communication of the communication unit 1004 and reading and/or writing of data in the memory 1002 and the storage 1003.

The processor 1001 controls the computer as a whole, for example, by operating an operating system. The processor 1001 may be constituted by a central processing unit (CPU) including an interface with peripherals, a control unit, a calculation unit, a register, and the like. For example, the signal transmitting unit 101, the signal receiving unit 102, the storage unit 103, and the measurement unit 104 of the user equipment UE and the signal transmitting unit 201, the signal receiving unit 202, and the broadcast unit 203 of the base station eNB may be embodied by the processor 1001.

The processor 1001 reads a program (program codes), a software module, or data from the storage 1003 and/or the communication unit 1004 to the memory 1002 and performs various processes in accordance therewith. As the program, a program causing a computer to perform at least a part of the operations described above in the embodiment is used. For example, the signal transmitting unit 101, the signal receiving unit 102, the storage unit 103, and the measurement unit 104 of the user equipment UE and the signal transmitting unit 201, the signal receiving unit 202, and the broadcast unit 203 of the base station eNB may be embodied by a control program which is stored in the memory 1002 and operated by the processor 1001 or the other functional blocks may be similarly embodied. Various processes described above have been described to be performed by a single processor 1001, but may be simultaneously or sequentially performed by two or more processors 1001. The processor 1001 may be mounted as one or more chips. The program may be transmitted from a network via an electric communication line.

The memory 1002 is a computer-readable recording medium and may be constituted, for example, by at least one of a read only memory (ROM), an erasable programmable ROM (EPROM), an electrically erasable programmable ROM (EEPROM), and a random access memory (RAM). The memory 1002 may be referred to as a register, a cache, or a main memory (a main storage unit). The memory 1002 can store a program (program codes), a software module, or the like which can be executed to perform the measurement method according to the embodiment.

The storage 1003 is a computer-readable recording medium and may be constituted, for example, by at least one of an optical disc such as a compact disc ROM (CD-ROM), a hard disk drive, a flexible disk, a magneto-optical disk (such as a compact disk, a digital versatile disk, or a Blu-ray (registered trademark) disk), a smart card, a flash memory (such as a card, a stick, or a key drive), a floppy (registered trademark) disk, and a magnetic strip. The storage 1003 may be referred to as an auxiliary storage unit. Examples of the recording medium may include a database including the memory 1002 and/or the storage 1003, a server, and another appropriate medium.

The communication unit 1004 is hardware (a transceiver device) that allows communication between computers via a wired and/or wireless network and is referred to as, for example, a network device, a network controller, a network card, or a communication module. For example, the signal transmitting unit 101 and the signal receiving unit 102 of the user equipment UE and the signal transmitting unit 201 and the signal receiving unit 202 of the base station eNB may be embodied by the communication unit 1004.

The input unit 1005 is an input device (such as a keyboard, a mouse, a microphone, a switch, a button, or a sensor) that receives an input from the outside. The output unit 1006 is an output device (such as a display, a speaker, or an LED lamp) that performs outputting to the outside. The input unit 1005 and the output unit 1006 may be configured as a unified body (such as a touch panel).

The units such as the processor 1001 and the memory 1002 are connected to each other via the bus 1007 for transmitting and receiving information. The bus 1007 may be constituted by a single bus or may be configured by different buses for the units.

The user equipment UE and the base station eNB may be configured to include hardware such as a microprocessor, a digital signal processor (DSP), an application specific integrated circuit (ASIC), a programmable logic device (PLD), or a field programmable gate array (FPGA) or a part or all of the functional blocks may be embodied by the hardware. For example, the processor 1001 may be mounted as at least one hardware module.

CONCLUSION

According to the above-described embodiment, there is provided user equipment of a radio communication system including a base station and the user equipment, the user equipment including a receiver that receives, from the base station, measurement band information indicating a frequency range in which received quality is measured in a system bandwidth; and a measurer that measures the received quality in the frequency range indicated by the measurement band information. With this user equipment UE, a received quality measuring method can be flexibly configured in the user equipment, and, thus, interference caused by an adjacent cell can be accurately measured for each cell.

The measurement band information may include plural frequency ranges. Accordingly, even when the system band is wide and the interference of an adjacent cell varies depending on the frequency, it is possible to suppress power consumption of the user equipment UE and to appropriately measure the received quality.

The receiver may receive the measurement band information from the base station using an RRC message in an RRC connected state and may receive the measurement band information from the base station using broadcast information in an RRC idle state. Accordingly, the user equipment UE can change the method of acquiring the measurement band information depending on the RRC state.

The measurer may measure received quality using any one of a reference signal or a synchronization signal which are mapped on the frequency range indicated by the measurement band information. Accordingly, the user equipment UE can measure the received quality using the reference signal or the synchronization signal.

The measurer may consider received quality of a signal having highest received quality among signals having the same cell ID as measured received quality when the signals transmitted from a plurality of specific antenna ports are received in the frequency range indicated by the measurement band information and the cell IDs included in the received signals are the same. Accordingly, the user equipment UE can appropriately measure the received quality even when beam sweeping is performed.

According to the embodiment, there is provided a base station of a radio communication system including the base station and user equipment, the base station including a communicator that broadcasts, to the user equipment, measurement band information indicating a frequency range in which the user equipment measures received quality in a system bandwidth; and a transmitter that transmits a synchronization signal in the frequency range and that transmits a Master Information Block, MIB, including information indicating the system bandwidth or information indicating a center frequency of a carrier, wherein the transmitter transmits the MIB in the same frequency range as the frequency range or a frequency range deviated by a predetermined offset from the frequency range. With this base station eNB, a received quality measuring method can be flexibly configured in the user equipment, and, thus, interference caused by an adjacent cell can be accurately measured for each cell.

According to the embodiment, there is provided a measurement method which is performed by a user equipment of a radio communication system including a base station and the user equipment, the measurement method including: receiving, from the base station, measurement band information indicating a frequency range in which received quality is measured in a system bandwidth; and measuring the received quality in the frequency range indicated by the measurement band information. With this measurement method, a received quality measuring method can be flexibly configured in the user equipment, and, thus, interference caused by an adjacent cell can be accurately measured for each cell.

Complement of Embodiment

The base station eNB may be referred to as a NodeB (NB), a base station, a gNB, or several other appropriate terms by those skilled in the art.

Transmission of the measurement band information is not limited to the aspect/embodiment described in this specification, and may be performed by other methods. For example, transmission of the measurement band information may be performed by physical layer signaling (such as downlink control information (DCI) or uplink control information (UCI)), medium access control (MAC) signaling, other signaling, or a combination thereof. Examples of the RRC message may be referred to as RRC signaling. The RRC message includes an RRC connection setup message and an RRC connection reconfiguration message.

The embodiment described in this specification may be applied to a system employing long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or a next-generation system which is extended on the basis thereof.

Determination or decision may be made by a value (0 or 1) represented by one bit, may be made by a Boolean value (Boolean: true or false), and may be made by comparison of numerical values (comparison with a predetermined value, for example).

Note that the terms described in this specification and/or the terms necessary for understanding of this specification may be replaced with terms having the same or similar meaning. For example, the channel and/or symbol may be signaling (signal). Furthermore, a signal may be a message.

The UE may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or it may also be called by some other suitable terms.

Each aspect/embodiment described in this specification may be used alone, may be used in combination, or may be used while being switched during the execution. Furthermore, notification of predetermined information (e.g., notification of "being X") is not limited to notification that is made explicitly, and the notification may be made implicitly (e.g., notification of the predetermined information is not performed).

The terms "determining" and "deciding" used in this specification may include various types of operations. For example, "determining" and "deciding" may include deeming that a result of calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The expression "on the basis of" used in the present specification does not mean "on the basis of only" unless otherwise stated particularly. In other words, the expression "on the basis of" means both "on the basis of only" and "on the basis of at least."

The processing sequences, the sequences, the flowcharts, and the like of the embodiment described above in this specification may be changed in the order as long as they are not incompatible with each other. For example, in the method described in this specification, elements of various steps are described in an exemplary order and the method is not limited to the described order.

Input and output information and the like may be stored in a specific location (for example, a memory) and may be managed by a management table. The input and output information and the like may be overwritten, updated, or rewritten. The output information and the like may be erased. The input information and the like may be transmitted to other apparatuses.

Notification of predetermined information (e.g., notification of "being X") is not limited to notification that is made explicitly, and the notification may be made implicitly (e.g., notification of the predetermined information is not performed).

Information, signals, and the like described in the present specification may be represented using any of various other techniques.

For example, data, instructions, commands, information, signals, bits, symbols, chips, and the like mentioned in the entire description may be represented by voltage, current, electromagnetic waves, magnetic field or magnetic particles, optical field or photons, or any combination thereof.

While the invention has been described above in detail, it is apparent to those skilled in the art that the invention is not limited to the embodiment described in the specification. The invention can be modified and embodied as a changed aspect without departing from the concept and scope of the invention which are defined by the appended claims. Accordingly, description in this specification is made for illustrative description and does not have any restrictive meaning.

This international patent application is based on and claims priority to Japanese Patent Application No. 2016-096524 filed on May 12, 2016 and Japanese Patent Application No. 2016-192351 filed on Sep. 29, 2016, and the entire content of Japanese Patent Application No. 2016-096524 and Japanese Patent Application No. 2016-192351 is incorporated herein by reference.

LIST OF REFERENCE SYMBOLS

UE user equipment
eNB base station
101 signal transmitting unit
102 signal receiving unit
103 storage unit
104 measurement unit
201 signal transmitting unit
202 signal receiving unit
203 broadcast unit
1001 processor
1002 memory
1003 storage
1004 communication unit
1005 input unit
1006 output unit

The invention claimed is:

1. A user equipment comprising:
a receiver that receives, from a base station, measurement band information indicating a frequency in which received quality is to be measured; and
a measurer that measures the received quality in the frequency indicated by the measurement band information,
wherein the measurer derives the received quality based on a synchronization signal on the frequency indicated by the measurement band information.

2. The user equipment according to claim 1, wherein the measurement band information includes a frequency range.

3. The user equipment according to claim 1, wherein the receiver receives the measurement band information from the base station through an RRC message in an RRC connected state and receives measurement band information from the base station through broadcast information in an RRC idle state.

4. The user equipment according to claim 1, wherein, when signals transmitted from a respective plurality of specific antenna ports are received in the frequency indicated by the measurement band information, and when cell IDs included in the respective received signals are identical, the measurer determines that, among the signals with the identical cell IDs, received quality of a signal with high received quality as measured received quality.

5. A base station of a radio communication system including the base station and user equipment, the base station comprising:
a communicator that broadcasts, to the user equipment, measurement band information indicating a frequency in which the user equipment is to measure received quality,
wherein the user equipment measures the received quality in the frequency indicated by the measurement band information, and
wherein the user equipment derives the received quality based on a synchronization signal on the frequency indicated by the measurement band information.

6. A measurement method which is performed by user equipment, the measurement method comprising:
receiving, from a base station, measurement band information indicating a frequency in which received quality is to be measured; and
measuring the received quality in the frequency indicated by the measurement band information,
wherein the user equipment derives the received quality based on a synchronization signal on the frequency indicated by the measurement band information.

7. The user equipment according to claim 1, wherein the frequency indicated by the measurement band information is associated with at least one sub-band of a system bandwidth.

* * * * *